United States Patent [19]

Kitamura et al.

[11] Patent Number: 4,972,215
[45] Date of Patent: Nov. 20, 1990

[54] LENS DRIVING APPARATUS FOR A CAMERA

[75] Inventors: Hiroshi Kitamura, Tokyo; Yoshiaki Kobayashi, Nagano, both of Japan

[73] Assignee: Olympus Optical Co., Ltd., Tokyo, Japan

[21] Appl. No.: 431,644

[22] Filed: Nov. 3, 1989

[30] Foreign Application Priority Data

Nov. 11, 1988 [JP] Japan .................................. 63-285517

[51] Int. Cl.⁵ .............................................. G03B 3/10
[52] U.S. Cl. ................................................ 354/195.1
[58] Field of Search ..................................... 354/195.1

[56] References Cited

U.S. PATENT DOCUMENTS 4,743,931  5/1988  Matsuzaki et al. .................. 354/400

FOREIGN PATENT DOCUMENTS 63-89826  4/1988  Japan .

Primary Examiner—Michael L. Gellner
Attorney, Agent, or Firm—Frishauf, Holtz, Goodman & Woodward

[57] ABSTRACT

A lens driving apparatus for use in a camera, which adjusts the focus or the angle of view of a lens by means of a motor driven in accordance with the amount of rotation and the rotational angle of a rotational operation member provided on a lens body or a camera body, comprises a first detector for detecting the operational direction and the amount of operation of the rotational operation member and generates an operational direction signal and an amount-of-operation pulse signal, a second detector for detecting the actual amount of driving of the lens and generating a drive pulse signal, a motor driver for rotating the motor in a direction according to the operational direction signal until the difference between the count value of an amount-of-operation pulse and an amount-of-driving pulse becomes O, and a velocity controller for setting a high speed to the motor driver when the above difference is large and setting a low speed to the motor drive when the difference is small.

24 Claims, 20 Drawing Sheets

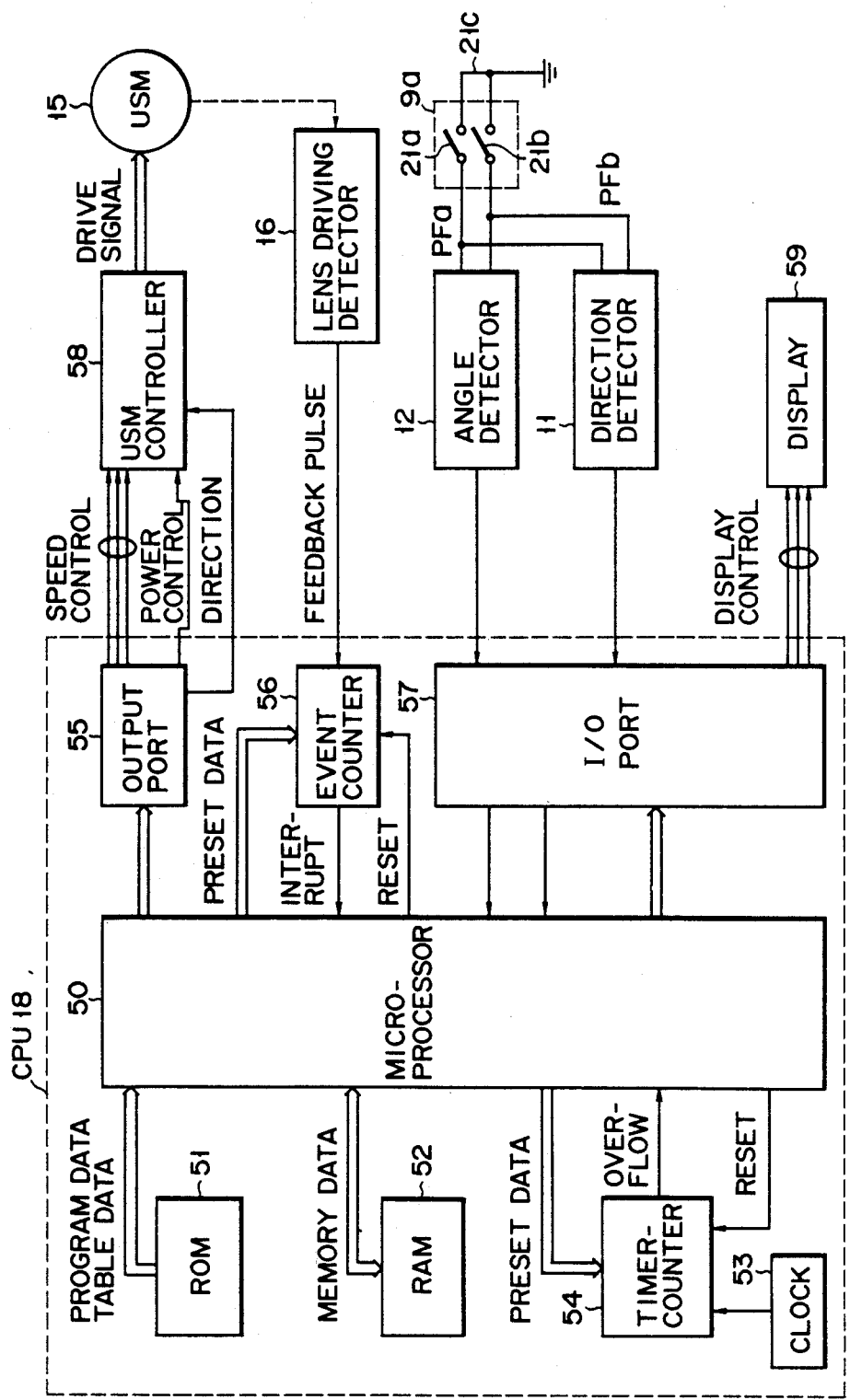
F I G. 7

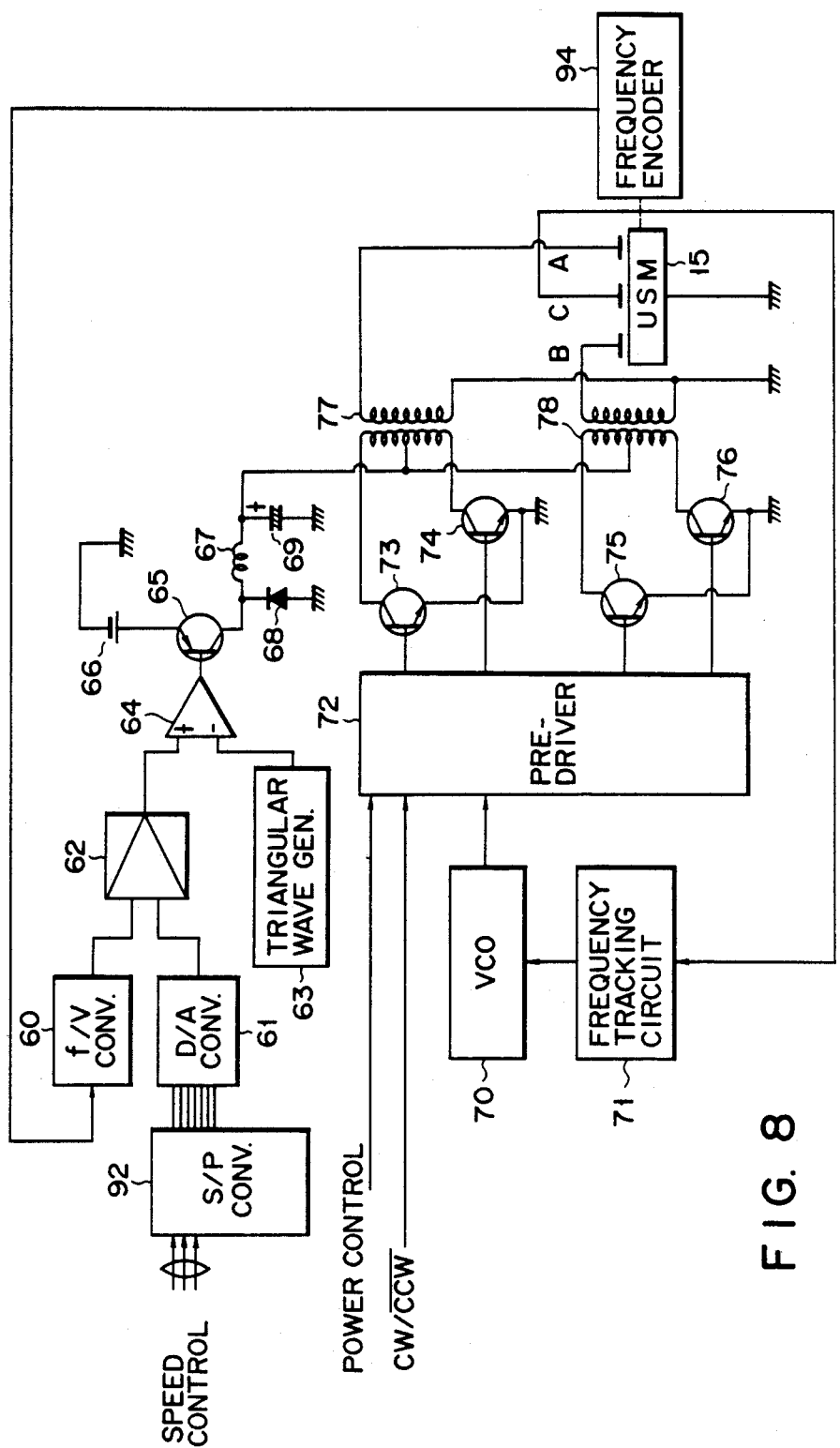
F I G. 8

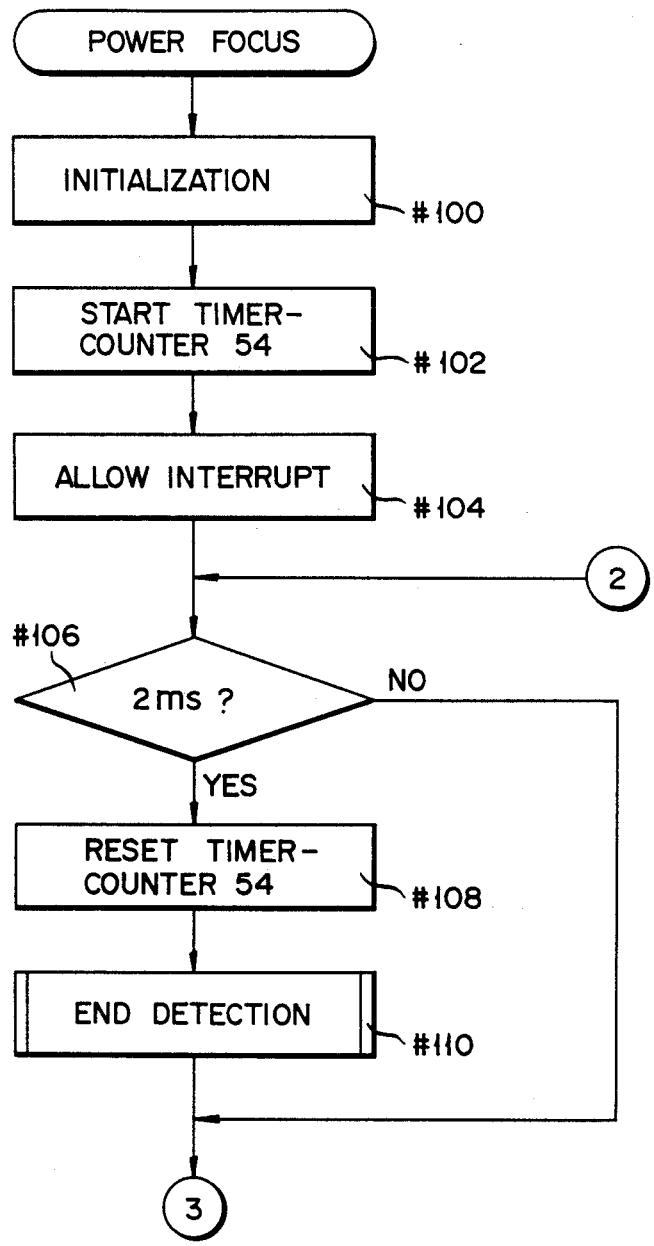
F I G. 9A

| FLAG | | | | | DISPLAY | JUMP DESIGNATION |
|---|---|---|---|---|---|---|
| PFINT-F | MPINT-F | CLS-F | INF-F | DIR-F | | |
| 0 | 0 | — | — | — | OFF | 2ms? (STEP #106) |
| 0 | 1 | — | — | — | OFF | MOTOR DRIVE (STEP #128) |
| 1 | — | 0 | 0 | — | OFF | MOTOR DRIVE (STEP #128) |
| 1 | — | 1 | 0 | 0 | CLOSEST | 2ms? (STEP #106) |
| 1 | — | 1 | — | 1 | OFF | MOTOR DRIVE (STEP #128) |
| 1 | — | 0 | 1 | 0 | OFF | MOTOR DRIVE (STEP #128) |
| 1 | — | 0 | 1 | 1 | INFINITY | 2ms? (STEP #106) |

FIG. 14

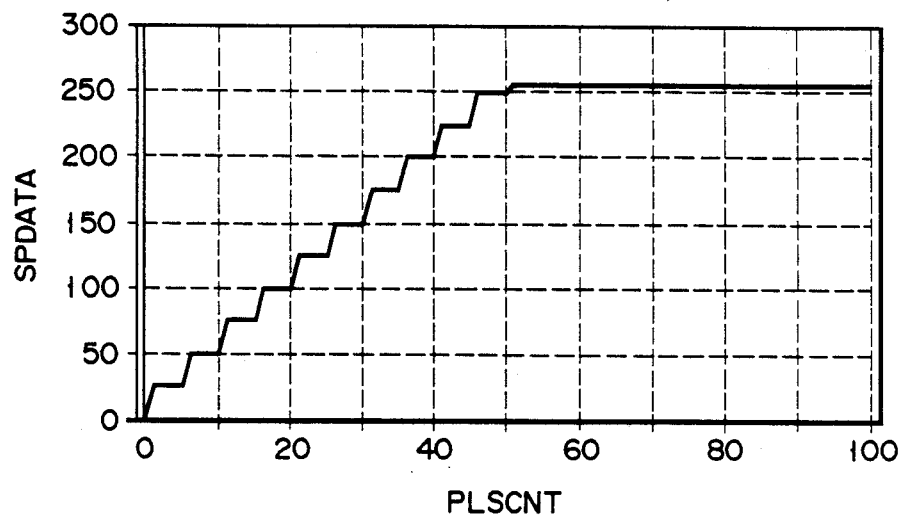
F I G. 15

LENS DRIVING APPARATUS FOR A CAMERA

BACKGROUND OF THE INVENTION

1. Field of the Invention

The present invention relates to a lens driving apparatus for electrically driving a lens in the optical axial direction, which is used in a power focusing apparatus, a power zooming apparatus or the like that controls the focus or the angle of view of a camera lens by means of the driving force of a motor.

2. Description of the Related Art

The Japanese Patent Disclosure (KOKAI) No. 63-89826 discloses a power focusing apparatus which has a manually operatable rotational operation member, detects the operational direction, the amount of operation and operating speed of this operation member, and controls the amount of driving, driving speed and driving direction of a camera lens respectively based on the detected amount of operation, operating speed and operational direction. Conventionally, a DC motor is used to drive such a camera lens. Since a DC motor has a low response speed and a large inertia, however, there is a demand for a new motor which has a small inertia and a good response characteristic and is suitable for driving a camera lens.

According to the conventional controlling method which detects the operational direction, the amount of operation and the operating speed of a rotational operation member and controls a motor in accordance with the detected data, however, if a motor having a good response characteristic such as an ultrasonic motor is used, it would respond too finely even to a slight change in operation of the rotational operation member. Although the motor can respond to manual operation with a high fidelity, the lens would move awkwardly if hand movement is awkward. The resultant operability is not particularly good. This also applies to a power zooming apparatus.

SUMMARY OF THE INVENTION

Accordingly, it is an object of the present invention to provide an apparatus for driving a lens by means of a motor, which apparatus can ensure prompt focusing and zooming without putting a photographer to great inconvenience.

A lens driving apparatus according to the present invention comprises a manually operable operation member for indicating driving of a lens, a first detector for detecting an amount of operation and an operational direction of the operation member and generating a first pulse signal according to the amount of operation and an operational direction signal according to the operational direction, a driver for driving the lens, a second detectior for detecting driving of the lens and generating a second pulse signal according to an amount of driving, a speed controller for sequentially setting a driving speed of the driver in accordance with a difference between an amount of operation indicated by the first pulse signal and a amount of driving indicated by the second pulse signal, and a controller for controlling the driver in accordance with the operational direction signal and an output of said speed controller.

BRIEF DESCRIPTION OF THE DRAWINGS

FIG. 7 is a detailed block diagram illustrating the circuit arrangement of the second embodiment;

FIG. 8 is a circuit diagram illustrating an ultrasonic motor controller;

FIGS. 9A and 9B form a flowchart illustrating a power focusing operation according to the second embodiment;

FIG. 14 is a diagram illustrating the relation between the values of various flags and on/off of a display and a motor;

FIG. 15 is a diagram illustrating the relation between the count values of a counter PLSCNT and motor speeds;

DETAILED DESCRIPTION OF THE PREFERRED EMBODIMENTS

The preferred embodiment of a lens driving apparatus of the present invention will now be described with reference to the accompanying drawings. The following description will be given of a power focusing apparatus as this embodiment which adjusts the focus by moving a lens by means of a motor that is driven according to a predetermined operation of an operation member, instead of the conventional manual focusing mechanism which performs focus adjustment by manual operation of a focusing ring of a camera lens. A power focusing apparatus may be applied as auxiliary means for a camera or a replaceable lens with an autofocus function, but the following description will be given of a case where the power focusing apparatus is applied to a manual focusing camera having not autofocus function.

Figure 1:
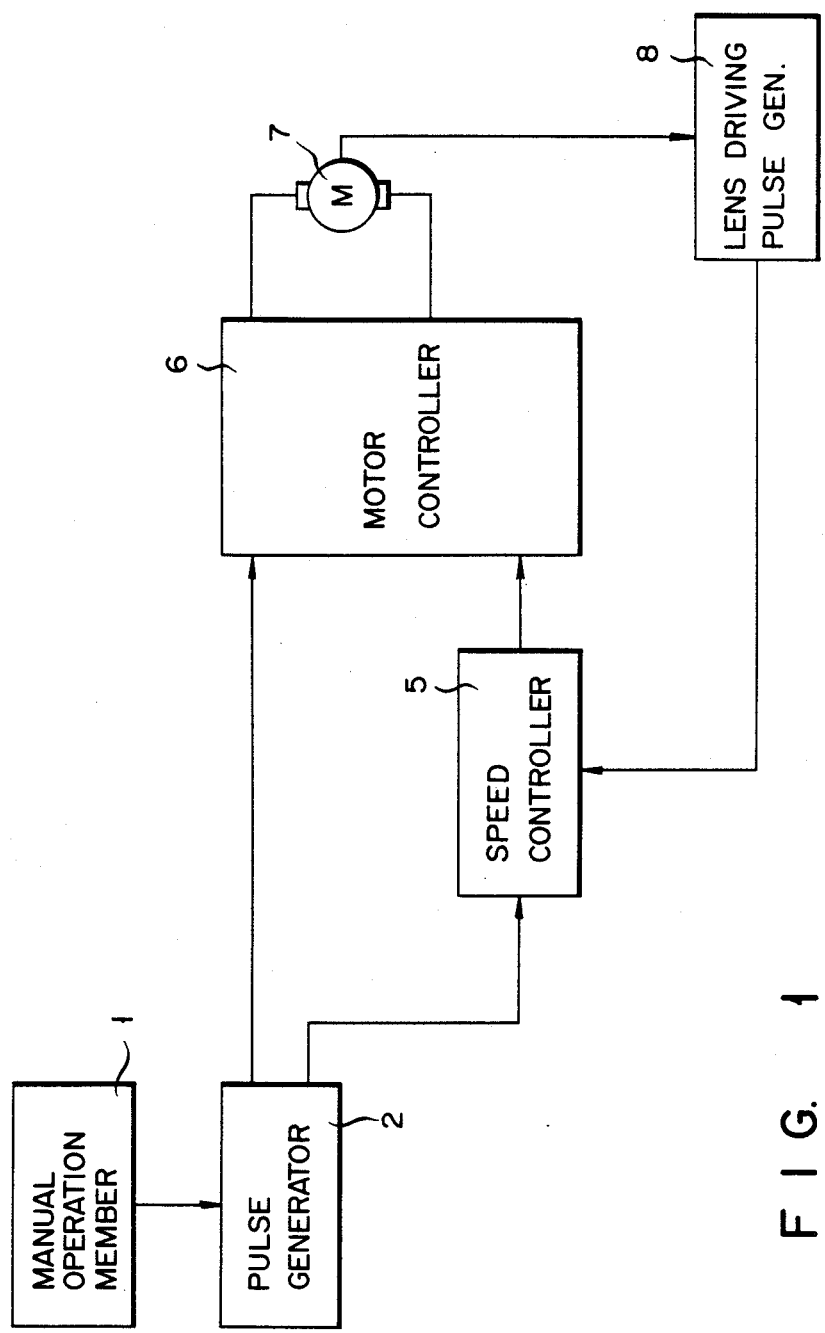
FIG. 1 is a schematic block diagram illustrating the arrangement of the first embodiment of a lens driving apparatus according to the present invention.

FIG. 1 is a schematic block diagram of the first embodiment. When a photographer operates a manual operation member 1, pulse generator 2 generates a direction signal in accordance with an operational direction of the operation member 1 and a amount-of-operation pulse signal in accordance with an amount of operation of the operation member 1. The direction signal is supplied to a motor controller 6 and the amount-of-operation pulse signal is supplied to a speed controller 5.

The controller 5 calculates an amount of driving the motor 7 based on the amount-of-operation pulse signal and a lens driving pulse signal from a generator 8 and supplies a driving speed signal to the motor controller 6. The motor controller 6 controls the motor 7 in accordance with the driving speed signal and the direction signal.

Accordingly, the motor is driven at a speed which is in accordance with an amount of operation of the operation member, the smooth lens driving is realized.

Figure 2:
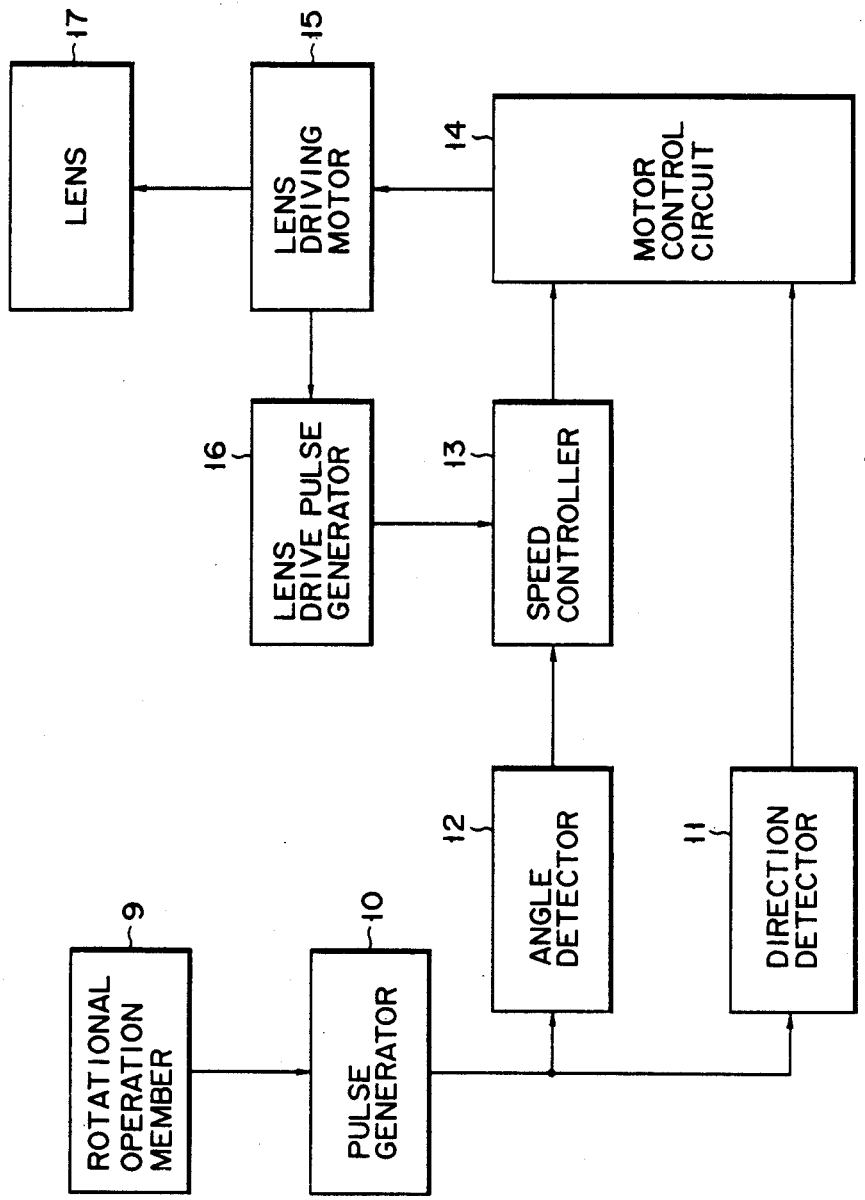
FIG. 2 is a schematic block diagram illustrating the arrangement of the second embodiment of the present lens driving apparatus.
Figure 3:
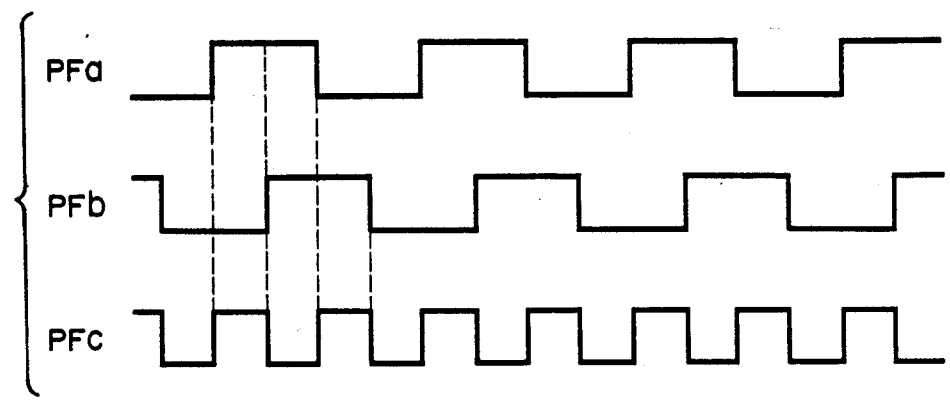
FIG. 3 is a diagram illustrating drive pulse signals generated in accordance with rotation of a rotational operation member.

FIG. 2 is a block diagram illustrating the general arrangement of a power focusing apparatus according to the second embodiment. A rotational operation member 9 is provided on a camera body or a lens body. This operation member 9 can endlessly rotate clockwise or counterclockwise. When the operation member 9 is manually operated, a pulse generator 10 generates two pulse signals PFa and PFb having different phases as shown in FIG. 3, in accordance with the rotation. These two pulse signals are input to an operational direction detector 11 and an amount-of-operation (operation angle) detector 12. The former detector 11 detects the operational direction of the operation member 9 from the phase advancing/delaying relation between the two pulse signals. The latter detector 12 generates a pulse signal PFc representing the amount of operation in high resolution and outputs it as amount-of-operation data. This pulse signal PFc, which rises or falls at the rising or falling of the pulse signal PFa or PFb, is obtained by doubling the signal PFa or PFb. Each of the pulse signals PFa and PFb may be used as it is as the amount-of-operation data.

A lens drive pulse generator 16 generates a lens drive pulse signal in accordance with the rotation of a lens driving motor 15 which moves a camera lens 17 along the optical axis for adjusting focus. This signal is supplied as feedback data to a driving speed controller 13. The amount-of-operation data from the amount-of-operation detector 12 is also input to the controller 13.

The speed controller 13 causes the same counter to count the two input pulse signals. The amount-of-operation data pulse, i.e., the pulse signal PFc, is upcounted, and the feedback data pulse, i.e., the lens drive pulse signal is down-counted. If driving of the lens drive motor 15 is stopped when the count value of this pulse counter reaches 0, therefore, it means that the motor 15 has been driven by an amount corresponding to the amount of operation of the operation member 9. The speed controller 13 sets a driving speed proportional to the count value of the pulse counter and outputs it as driving speed data. That is, the larger the count value, the faster the driving speed, and the smaller the counter value, the slower the speed. When the count value is 0, the speed is set to 0. In other words, for a large amount of movement, the lens is driven at a high speed, and for a small amount of movement, the lens is driven at a low speed. Actually, at the beginning of the movement, a high speed is set and the driving speed is gradually reduced as the lens approaches the target position. The speed finally becomes 0 and the lens stops at this position.

The driving speed data output from the speed controller 13 and the operational direction from the direction detector 11 are input to the motor control circuit 14, which in turn controls the lens driving motor 15 based on the received data.

Figure 4A:
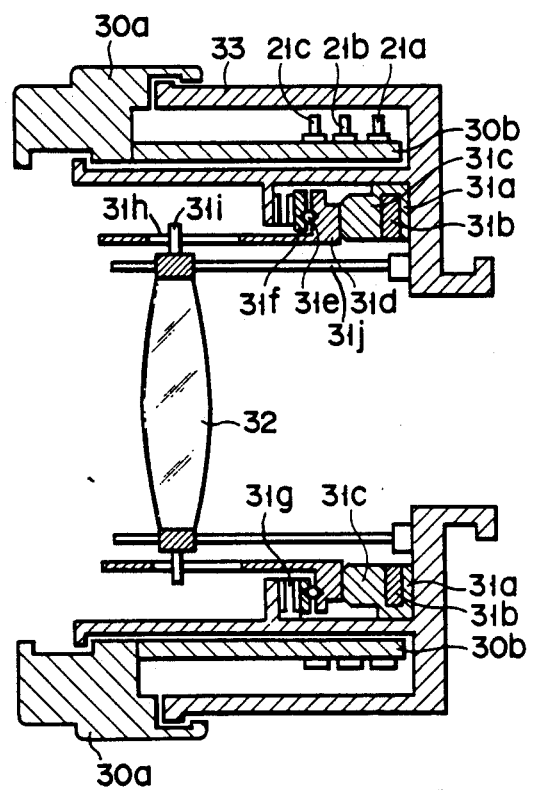
FIG. 4A is a diagram exemplifying the arrangements of the rotational operation member and a pulse generator.

FIG. 4A exemplifies the rotational operation member 9 and pulse generator 10 in the second embodiment. The following case where the operation member 9 is provided on the lens body. The operation member 9 comprises a cylindrical operation number 30a provided at part of a lens body 33 (at the front end in this example) in endlessly rotatable manner, and a rotational cylinder 30b integrated with the member 30a and disposed inside the lens body 33. A conductive pattern 22 shaped as shown in FIG. 5 is stuck on the outer surface of the rotational cylinder 30b. Contact pieces 21a to 21c, which are made of a conductor and each have one end secured to the lens body 33 (not shown in FIG. 5), are pressed against the pattern 22. The contact pieces 21a and 21b are rendered conductive or non-conductive with the contact piece 21c through the conductive pattern 22 by the rotation of the rational cylinder 30b. The shape of the conductive pattern 22 is determined in such a way that there is a 90° phase difference between the timings at which the contact pieces 21a and 21b are rendered conductive with the contact piece 21c. This conduction can therefore be electrically detected, and the operational direction of the rotational operation member 30a can be detected from which one of the phases of the two pulse signals PFa and PFb from the pieces 21a and 21b advances. An amount-of-operation signal, which is the pulse signal PFa or PFb doubled, can be acquired by generating pulses at the rising and falling of a pulse which is generated by rendering the contact piece 21a conductive or non-conductive with the contact piece 21c. The power focusing apparatus according to this embodiment is designed in such a manner as to determine the driving direction and the amount of driving of an ultrasonic motor 31a to 31g disposed in the lens body, based on the data of the operational direction and the amount of operation, and to move a focus adjusting lens 32 (other lenses being omitted in FIG. 4) along the optical axis. This lens 32 moves within a predetermined moving range 31h.

Figure 4B:
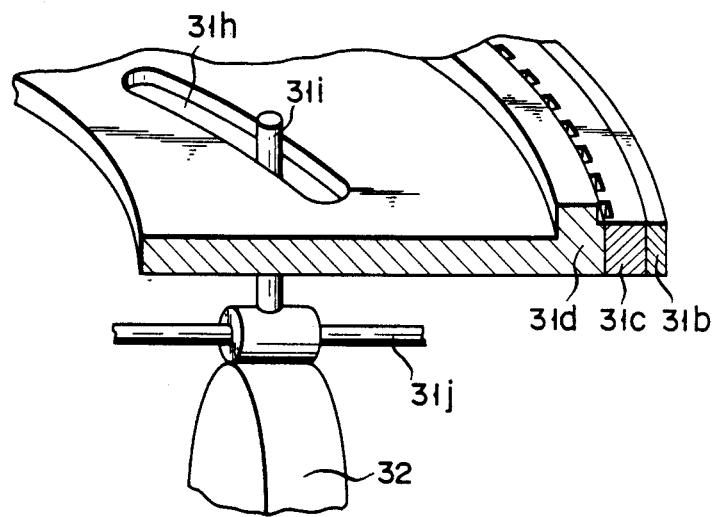
FIG. 4B is a diagram illustrating a part of an ultrasonic motor.
Figure 5:
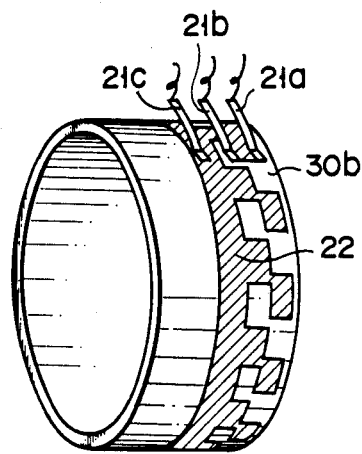
FIG. 5 is a perspective view of the rotational operation member.

FIG. 4B illustrates a part of the ultrasonic motor. When a piezoelectric element 31b is electrically conducted, a vibration ring 31c is vibrated to generate a progressive wave along the ring 31c. A rotor 31d which is pressed against the ring 31c is rotated in accordance with a rotation of the ring 31c. The lens 32 is guided by a guide rod 31j in an axial direction so that the rotation movement of the rotor 31d is converted into a linear movement of the lens 32 through a roller 31i and a cam groove 31h. The lens 32 is movable in the range defined by the groove 31h.

Figure 6:
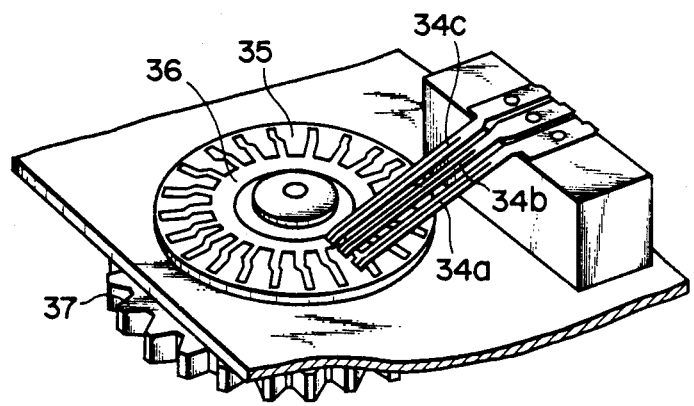
FIG. 6 is a diagram illustrating different arrangements of the rotational operation member and pulse generator.

FIG. 6 illustrates another example of each of the rotational operation member 9 and pulse generator 10. The following description will be given of a case where the operation member 9 and pulse generator 10 are provided on the camera body. When rotational operation member 37 provided outside the camera body is rotated, a rotational plate 35 provided inside the camera body rotates interlockingly. The rotation of the plate 35 causes contact pieces 34a and 34b to become conductive or non-conductive with a contact piece 34c with a phase difference of 90° through a conductive pattern 36 stuck on the plate 35. The lens driving motor is controlled in the same manner as described in the previously-described case where the operation member and pulse generator are provided on the lens body.

As described above, the operation member 9 and pulse generator 10 have only to be provided on either the lens body or camera body, and the pulse generator 10 is constituted by an encoder switch. In the following description, the rotational operation member 9 and pulse generator 10 are provided on the lens body.

Referring now to FIGS. 7 and 8, a practical circuit arrangement of the second embodiment will be described. FIG. 7 is a general circuit block diagram of the second embodiment in which the lens driving motor 15 is constituted by an ultrasonic motor (USM). A pulse generator 10 having the contact pieces 21a to 21c and is rendered on/off in accordance with the amount of operation of the operation member 9. Signals from the pulse generator 10 are input as the two-phase pulse signals PFa and PFb (see FIG. 3) to the amount-of-operation detector 12 and the direction detector 11, which in turn a PF encoder amount-of-operation signal PFc (representing the amount of operation of the rotational operation member 30a) and a PF encoder direction signal (representing the operational direction of the member 30a), respectively. The former signal changes its status when the status of the two-phase pulse signal PFa or PFb is changed. The PF encoder direction signal has an "H" (high) level when the operational direction of the operation member 30a is clockwise (CW) and has an "L" (low) level when the direction is counterclockwise (CCW). The PF encoder amount-of-operation signal and PF encoder direction signal are input to a CPU 18.

The CPU 18 supplies a speed control signal and a driving direction signal (indicating CW when "H" and CCW when "L") to an ultrasonic motor (USM) controller 58. The former signal is for setting the rotational speed of the ultrasonic motor 15, and the latter signal is for setting the driving direction. The speed control signal is transferred as 8-bit serial data so that it is possible to set 256 types of speed data from 0 to 255. The USM controller 58 supplies a drive signal to the motor 15 so that the speed becomes maximum when the speed data is 255 and it is the lowest when the speed data is 0 (i.e., the motor is stopped). The amount of driving of the motor 15 is detected by the lens driving detector 16, and the amount of lens movement is supplied as a feedback signal (pulse signal) to the CPU 18. A display 59, provided in the finder of the camera, informs a photographer of the lens pressing the driving end (closest end or infinity end) during the driving of the lens.

As indicate by the broken block in FIG. 7, the CPU 18 for controlling power focus comprises a microprocessor 50 for performing computations and control, a ROM 51 for storing a program and a data table, a RAM 52 for temporary storage of data, a timer counter 54 for counting the time, a clock pulse generator 53 for supplying a clock to the timer counter 54, an output port 55 for outputting control signals to the USM controller 58, an external event counter 56 for counting pulses supplied externally, and an input/output port 57 for controlling an interface with other external units. The timer counter 54, providing a timer function in the CPU 18, counts clock pulses generated every 1 μsec from the clock pulse generator 53, and outputs a timer overflow signal to the microprocessor 50 when the count value coincides with timer count preset data set by the microprocessor 50. The event counter 56 counts feedback pulses (representing the amount of lens movement) from the lens driving detector 16, and outputs a motor pulse interrupt signal to the microprocessor 50 when the count value coincides with amount-of-lens-movement preset data set by the microprocessor 50.

FIG. 8 is a detailed circuit diagram of the USM controller 58. The speed control signal, constituted by 8-bit serial data set by the CPU 18, is converted into parallel data by a serial/parallel (S/P) converter 92. This parallel data is then converted into an analog voltage by a D/A converter 61 and is supplied to one input terminal of a differential amplifier 62. The rotational speed of the motor 15 detected by a frequency encoder 94 is input as an analog voltage to the other input terminal of the differential amplifier 62 through a frequency/voltage (F/V) converter 60. The differential amplifier 62 sends a difference signal representing the difference between the two inputs, i.e., the set speed and actual driving speed, to a comparator 64. The comparator 64 compares this difference signal as a judging level with the output of a triangular wave generator 63 and provides a pulse width modulation (PWM) output. This PWM output signal renders a transistor 65 on or off. Power supplied through this transistor 65 from a power source 66 passes through a smoothing circuit, comprising a choke coil 67, a capacitor 69 and a diode 68, and is applied to transformers 77 and 78 as a voltage proportional to the on/off ratio of the transistor 65. The transformers 77 and 78, which increase the voltage from the power source 66 to a level needed by the motor 15, are controlled by a pre-driver 72 and transistors 73 to 76.

The pre-driver 72 distributes the pulse from a voltage-controlled oscillator 70 to the transistors 73 to 76 in such a way that a 90° phase-shifted AC voltage is generated, and inverts the phase relation in accordance with a direction specifying signal CW/$\overline{CCW}$ from the CPU 18. When 90° phase-shifted AC voltage increased by the transformers 77 and 78 is supplied to electrodes A and B of the motor 15 by a resonance frequency, the motor 15 rotates with this resonance frequency. The resonance status of the motor 15 is monitored by an electrode C and is supplied to a frequency tracking circuit 71. The circuit 71 controls the oscillation frequency of the voltage-controlled oscillator 70 in such a way that the oscillation frequency coincides with the resonance frequency. In the above manner, the motor 15 rotates at a speed corresponding to the speed control signal through a feedback loop.

Figure 9B:
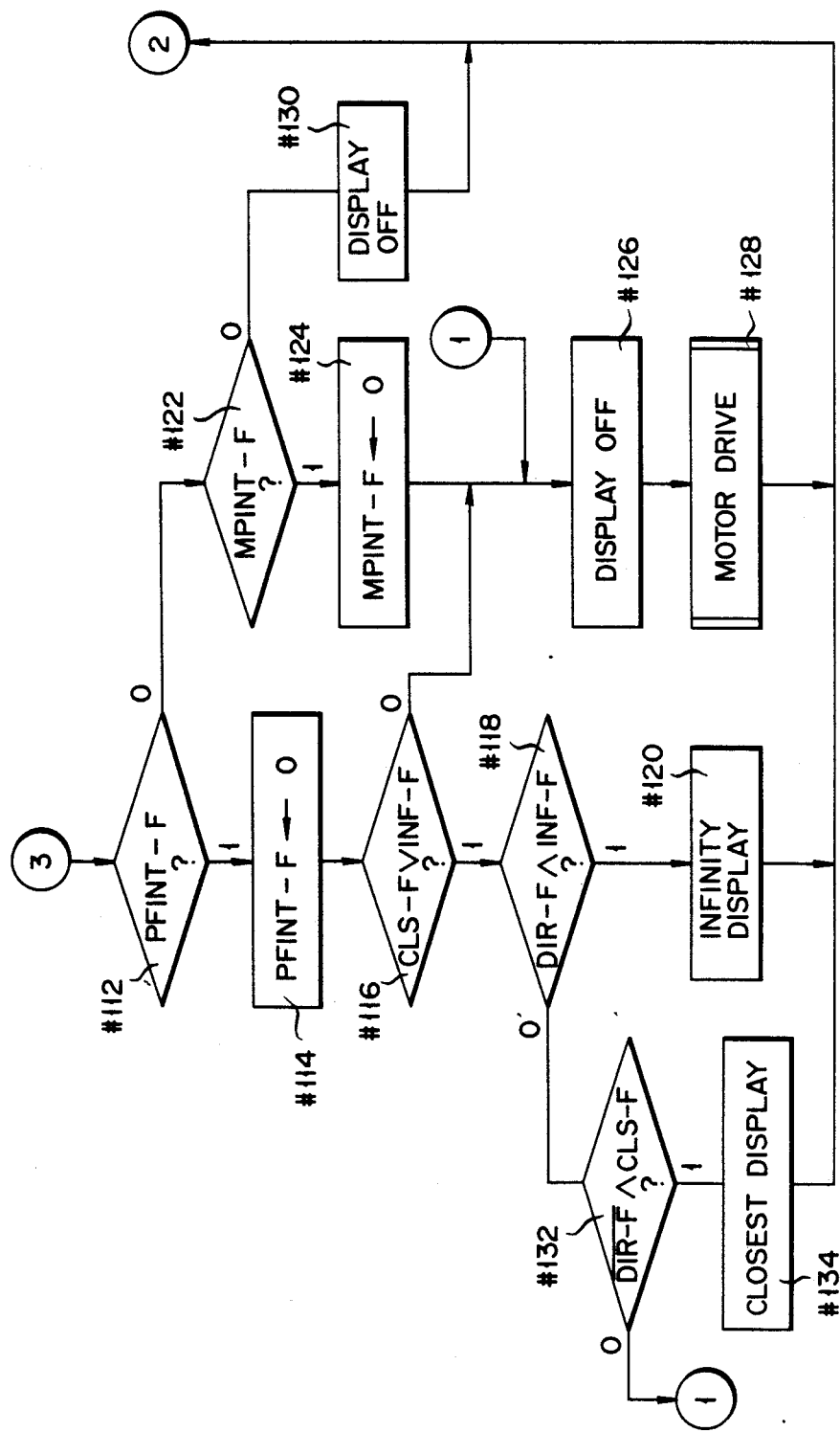

The operation of thus arranged second embodiment will now be described referring to the flowcharts shown in FIGS. 9A through 13. FIG. 9A and 9B are a flowchart illustrating the flow of the operation of the microprocessor 50 in a "Power Focus" routine. This routine starts when a power focus mode is set or power is given. In the first step #100, initialization is executed, i.e., the flags and counters are cleared and the input-/output ports are initialized. In step #102 the timer counter 54, which generates the overflow signal every 2 ms, starts functioning. In step #104 interruption is allowed, thus starting the power focusing operation.

In this embodiment, there are two interruptions: the first one is a "PF Encoder Interruption" generated by the PF encoder amount-of-operation signal output by rotating the rotational operation member 30a, and the second one is a "Feedback Interruption" generated by the feedback signal output by rotating the motor 15.

In step #106 it is determined whether or not 2 ms has elapsed from the start of the function of the timer counter 54 and the overflow signal has been produced. If 2 ms has elapsed, the timer counter 54 is reset in step #108 and a subroutine "End Detection" is executed in step #110. If 2 ms has not elapsed, step #112 is executed without resetting the timer counter 54 or executing the subroutine "End Detection."

Figure 10:
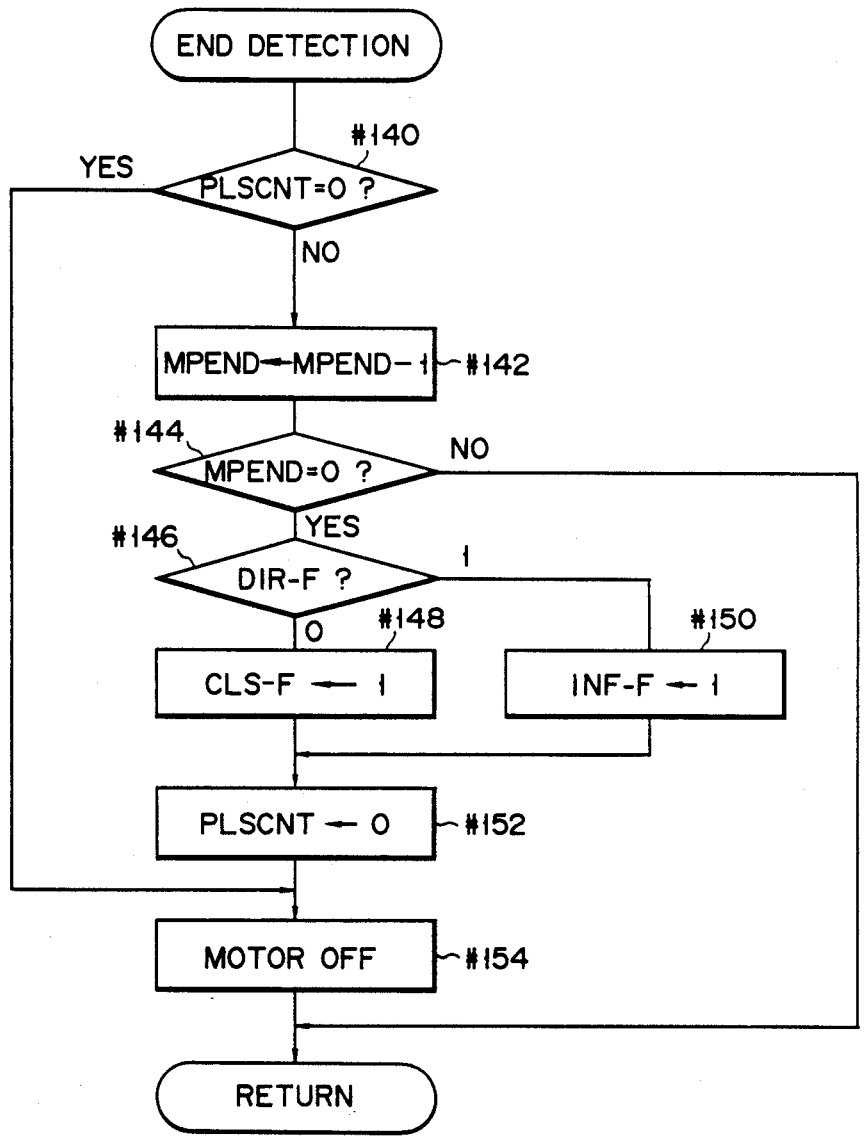
FIG. 10 is a flowchart for a subroutine "End Detection"

FIG. 10 illustrates a flowchart for the subroutine "End Detection" executed every 2 ms. In step #140 it is determined whether or not the value of a counter PLSCNT is 0. When PLSCNT=0, it is considered that the operation member 30a is not operated or the lens has reached the driving end stopper even if the member 30a is operated. In step #154, therefore, the motor 15 is turned off and the flow returns to the original routine. When PLSCNT≠0, which means that the motor is to be driven, it is determined whether or not the lens is pressed against the driving end stopper. Accordingly, in the next step #142, the value of a counter MPEND, in which 25 is set every time the "Feedback Interruption" occurs, is decremented by 1. The value of the counter MPEND is decremented every 2 ms unless the "Feedback Interruption" occurs, and it becomes 0 upon elapse of 50 ms (=2 ms×25). In other words, if the lens 16 is not moved for 50 ms, it can be considered that the lens is pressed against the driving end stopper. In step #144 it is determined whether or not the lens is pressed against the driving end stopper by checking if MPEND=0. If MPEND≠0, which means the lens is not pressed against the driving end stopper, the flow promptly returns to the original routine. If MPEND=0, which indicates that the lens is pressed against the driving end stopper, the value of a motor direction control flag DIR-F indicating the driving direction of the motor 15 is checked in order to find if this end is the closest end or infinity end. If the value of this flag is 0, 1 is set in a closet end flag CLS-F in step #148. If the value of the flag DIR-F is 1, 1 is set in an infinity end flag INF-F in step #150. Then, the counter PLSCNT is set to 0 in step #152 and the motor 15 is turned off in step #154. The flow then returns to the original routine. In the above manner, it is determined whether or not the lens is pressed against the driving end stopper in accordance with whether or not the value of the counter MPEND is 0.

In the "Power Focus" routine in FIG. 9B, it is determined whether the lens is pressed against the closest end stopper or infinity end stopper after execution of the subroutine "End Detection". First, the value of a flag PFINT-F indicating the type of interruption is checked in step #112. If the value of this flag PFINT-F is 1, which means that the "PF Encoder Interruption" has occurred by the rotation of the operation member 30a, 0 is set in the flag PFINT-F in step #114. In step #116 a logical sum (OR) of the values of the flags CLS-F and INF-F is checked. If the logical sum of these flags is 1, which means that the lens is pressed against the closest end stopper or infinity end stopper a logical product (AND) of the flags DIR-F and INF-F is checked in step #118. If this logical product is 1, which means that the lens has reached the infinity end stopper and an instruction is given to further drive the lens in the infinity direction, an infinity display is turned on in step #120 and the flow then returns to step #106.

If the logical product of the flags DIR-F and INF-F is 0 in step #118, which means that the lens has reached the closest end stopper, a logical product of the flags DIR-F and CLS-F is checked in step #132. If the logical product of the flags DIR-F and CLS-F is 1, which means that the lens has reached the closest end stopper and an instruction is given to further drive the lens in the closing direction, a closest display is turned on in step #134 and the flow then returns to step #106.

If the logical product of the flags DIR-F and CLS-F is 0 in step #132, it means that the lens has reached the closest end stopper but no instruction is given to further drive the lens in the closing direction, or the lens has reached the infinity end stopper but no instruction is given to further drive the lens in the infinity direction. In this case, the display (closest display or infinity display) is turned off in step #126 and the flow returns to step #106 after executing the subroutine "Motor Drive" in step #128.

If the logical sum of the flags CLS-F and INF-F is 0 in step #116, which means that the lens has not reached the end, the display is turned off in step #126 and the flow returns to step #106 after execution of the subroutine "Motor Drive" in step #128.

If the value of the flag PFINT-F is 0 in step #112, which means that the "PF Encoder Interruption" has not occurred, the value of a flag MPINT-F indicating occurrence of the "Feedback Interruption" is checked in step #122. If the value of the flag MPINT-F is 1, which indicates the occurrence of the "Feedback Interruption," 0 is set in this flag in step #124 and the flow returns to step #106 after the display is turned off in step #126 and the subroutine "Motor Drive" is executed in step #128. If the value of the flag MPINT-f is 0, which indicates that no interruption has occurred, the display is turned off in step #130 before the flow returns to step #106.

The steps following step #112 are for determining whether or not the motor should be driven and whether the display should be turned on or off in accordance with the levels of the flags PFINT-F, MPINT-F, CLS-F, INF-F and DIR-F. The branching destination steps associated with the determination results are illustrated in FIG. 14. As should be clear from FIG. 14, the flow branches to the subroutine "Motor Drive" (step #128) only when either the interruption flag PFINT-F or MPINT-F is 1. Even with the flag PFINT-F being 1, however, if the lens has reached the end and an instruction to further drive the lens in a direction to press the lens against the end stopper, either the closest display or infinity display is turned on in the finder and the motor is not driven. The closest display and infinity display are constituted by LEDs or the like provided at the bottom of the field of view in the finder.

Figure 11:
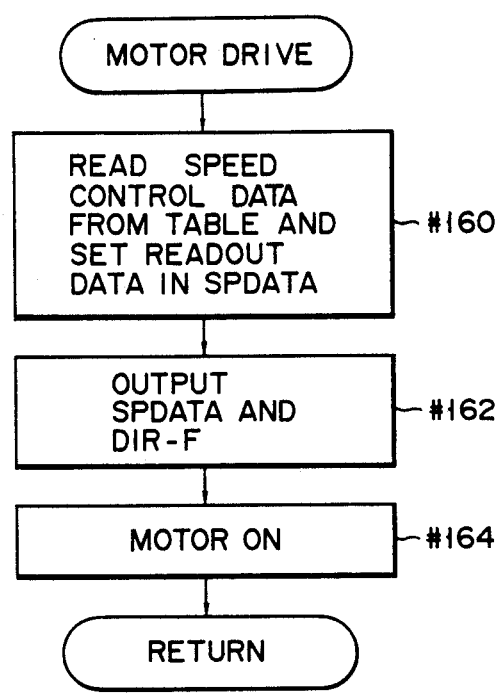
FIG. 11 is a flowchart for a subroutine "Motor Drive"

FIG. 11 is a flowchart for the subroutine "Motor Drive." In step #160, speed data obtained from the count value of the counter PLSCNT referring to a speed control data table is set in a register SPDATA. The values of the register SPDATA and flag DIR-F are output to the USM controller 58 in step #162. The motor is turned on in step #164 and the flow returns to the original routine. In other words, the speed is controlled in accordance with the value of the counter PLSCNT and the rotational direction is controlled in accordance with the value of the flag DIR-F. Table 1 below shows the speed control data table. FIG. 15 illustrates the relation between the value of the counter PLSCNT and the value of the register SPDATA.

TABLE 1

| PLSCNT | Speed Control Data |
|---|---|
| 0 | 0 |
| 1-5 | 25 |
| 6-10 | 50 |
| 11-15 | 75 |
| 16-20 | 100 |
| 21-25 | 125 |
| 26-30 | 150 |
| 31-35 | 175 |
| 36-40 | 200 |
| 41-45 | 225 |
| 46-50 | 250 |
| 51- | 255 |

There are 256 values of the speed control data, from 0 to 255, available. In view of the response characteristic of the motor and the human sensitivity, however, such a highly accurate control is not required, and 12 different sets each varying by the scale of 25 from the adjacent set as shown in the Table 1 is sufficient for the focus adjustment. The relation between the value of the register SPDATA and the rotational speed of the motor is determined in such a way that the motor is stopped when SPDATA=0 and it rotates at the maximum speed when SPDATA=255. This relation is expressed by the following equation:

$$\text{Rotational Speed} = a \times \text{SPDATA} \tag{1}$$

where a is a constant determined by the control circuit.

Figure 12:
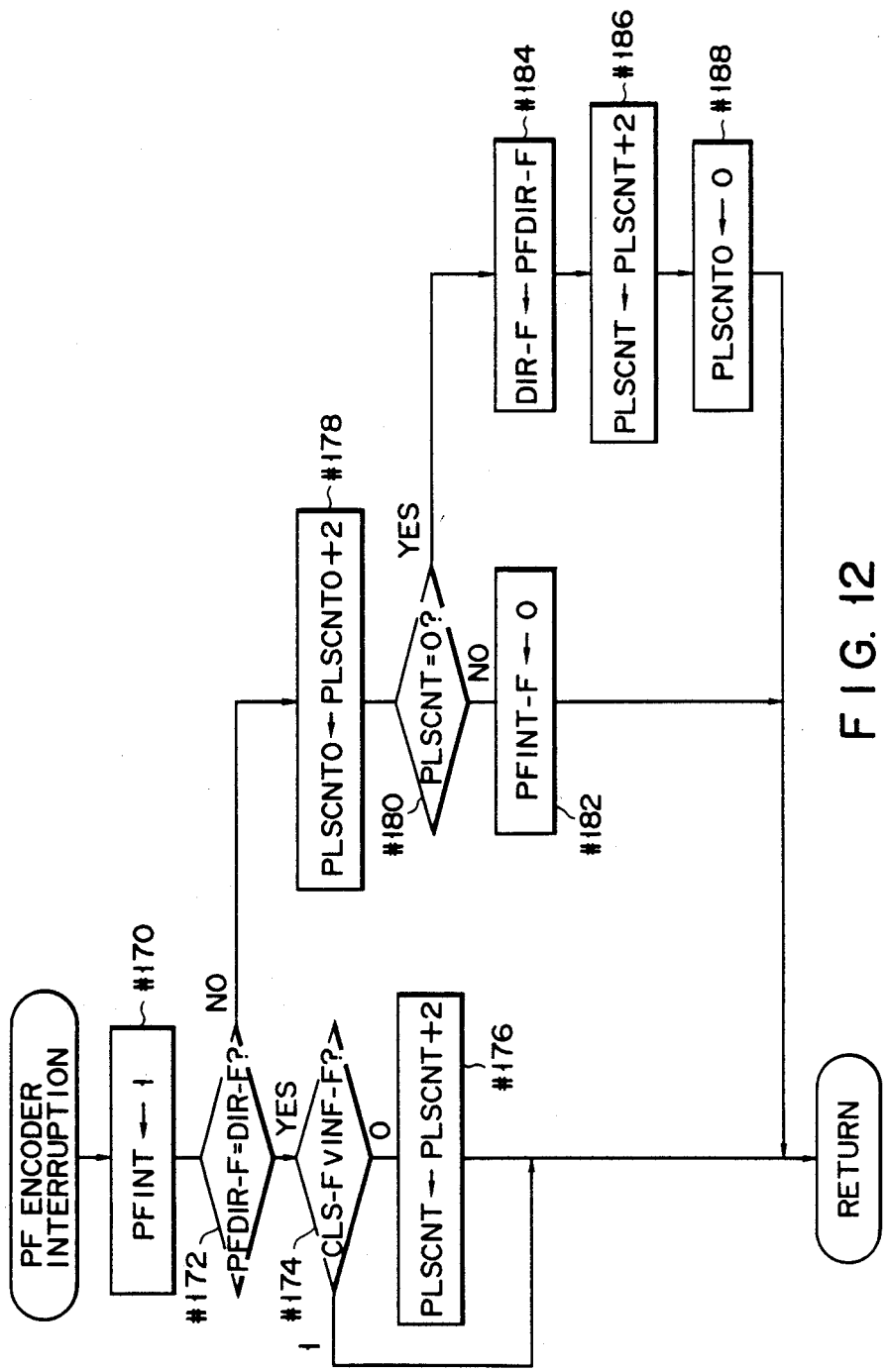
FIG. 12 is a flowchart for a subroutine "PF Encoder Interruption"

FIG. 12 is a flowchart for the subroutine "PF Encoder Interruption". Assuming that a photographer has operated the operation member 30a and the subroutine "PF Encoder Interruption" has occurred, the flag PFINT-F indicating the occurrence of this interruption is set to 1 in step #170. In the subsequent step #172 it is determined whether or not the value of the flag PFDIR-F equals the value of the flag DIR-F. The Flag PFDIR-F is 1 when the operational direction of the operation member 30a is clockwise (CW) and 0 when it is counterclockwise (CCW), while the flag DIR-F is 1 when the motor driving direction is in the infinity direction and is 0 when this direction is in the closing direction. If the values of the flags PFDIR-F and DIR-F equal to each other, the operational direction of the operation member 30a is the same as the rotational direction of the motor 15 and the motor should be further driven in that direction. In step #174, the value of the logical sum of the flags CLS-F and INF-F is checked. If this logical sum is 0, which indicates that the lens has not reached the closest end or the infinity end, the value of the counter PLSCNT is incremented by a given number, e.g., 2, in step #176 before returning to the original routine. If the logical sum of the flags CLS-F and INF-F is 1, which indicates that the lens has reached the closest end or the infinity end, the flow promptly returns to the original routine.

If the values of the flags PFDIR-F and DIR-F are not equal to each other in step #172, for example, when the rotational direction of the operation member 30a is abruptly reversed by a photographer, the value of the counter PLSCNTO is incremented by a given number, e.g., 2, in step #178 and it is determined whether or not the value of the counter PLSCNT is 0 in step #180. If the value of the counter PLSCNT is not 0, which indicates that the lens has not been driven by the set amount of driving, the lens should be further moved in the direction it has been moving before the rotational direction has been reversed. Therefore, 0 is set in the flag PFINT-F in step #182 to indicate that the "PF Encoder Interruption" has not occurred, then the flow returns to the original routine.

If the value of the counter PLSCNT is 0 in step #180, which indicates that the motor is not presently rotating, the motor should be driven in the direction specified by the flag PFDIR-F so that the value of this flag is set in the flag DIR-F in step #184. The value of the counter PLSCNT is incremented by 2 in step #186, 0 is set in the value of the counter PLSCNTO in step #188, then the flow returns to the original routine.

Figure 13:
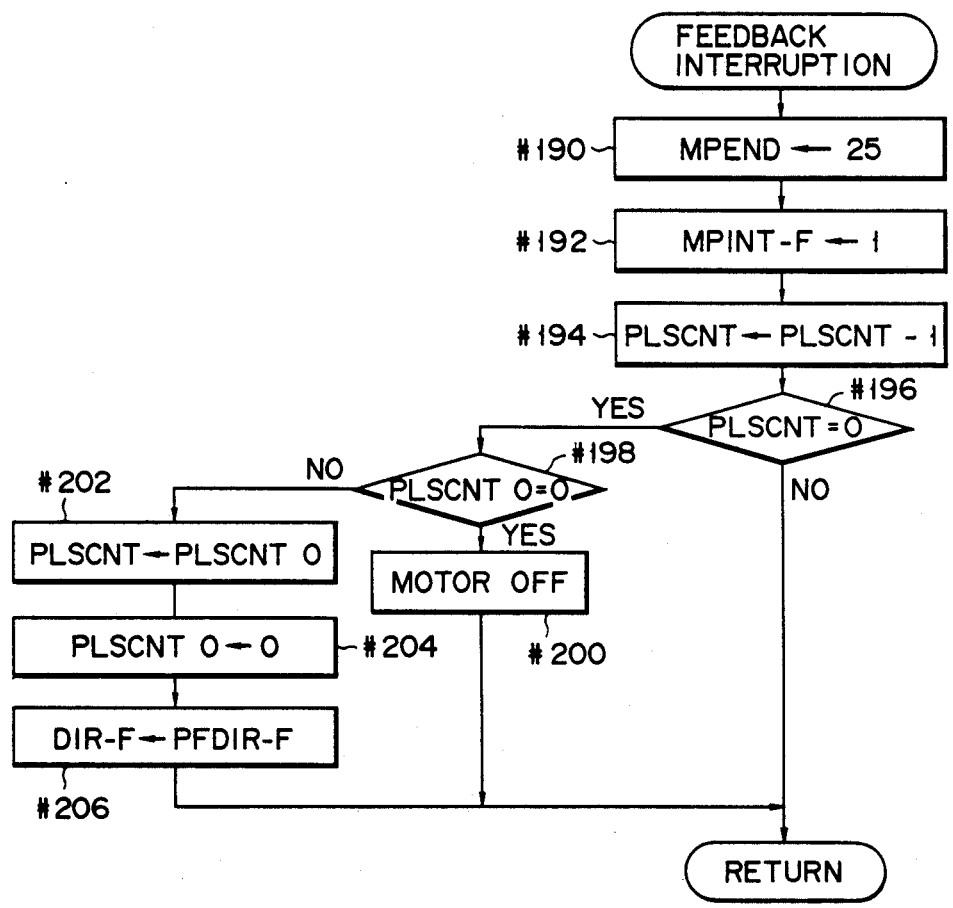
FIG. 13 is a flowchart for a subroutine "Feedback Interruption"

FIG. 13 is a flowchart for the subroutine "Feedback Interruption". When the feedback signal is output by the rotation of the motor 15, 25 is set to the counter MPEND for detecting the lens reaching the closest end or the infinity end. As described in the foregoing description of the subroutine "End Detection" executed every 2 ms, the counter MPEND is down-counted. When the value of this counter becomes 0, it can be considered that the lens has reached the end, and this value is used to set 1 to either the closest end flag CLS-F or infinity end flag INF-F based on the value of the flag DIR-F. In step #192, 1 is set in the flag MPINT-F indicating that the "Feedback Interruption" has occurred and the value of the counter PLSCNT is decremented by 1 in step #194. In step #196 it is determined whether or not the decrementing result is 0. If the result is not 0, the flow promptly returns to the original routine. If the decrementing result is 0, it is determined in step #198 whether or not the value of the counter PLSCNTO, which is counted up only when the value of the flag PFDIR-F differs from that of the flag DIR-F, is 0. If the value of the counter PLSCNTO is 0, which means that it is unnecessary to drive the motor in the reverse direction, the motor is turned off in step #200 before the flow returns to the original routine.

If the value of the counter PLSCNTO is not 0 in step #198, which means that the motor should be driven in the reverse direction, this counter value is set in the counter PLSCNT in step #202 and the counter PLSCNTO is cleared (set to 0) in step #204. Then, the value of the flag PFDIR-F is set in the flag DIR-F in step #206 before the flow returns to the original routine.

Figure 16:
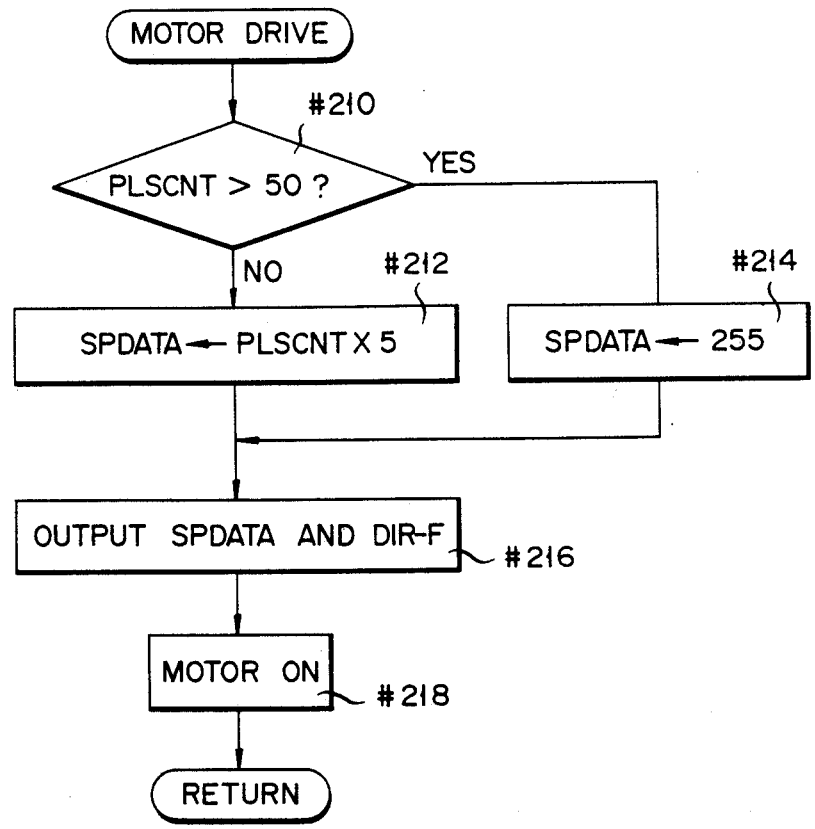
FIG. 16 is a flowchart for a subroutine "Motor Drive" according to a modification of the second embodiment.

According to this embodiment, the speed control data is read out from the counter PLSCNT using the table as shown in the Table 1. The speed control data may however be acquired by subjecting the data of the counter PLSCNT to a proper arithmetic operation without using such a table. The flowchart for the subroutine "Motor Driver" of this modification is illustrated in FIG. 16. In step #210 it is determined whether or not the data of the counter PLSCNT is greater than 50. If the data is not greater than 50, the data of the PLSCNT is multiplied by 5 and the result is set in the register SPDATA in step #122. IF the data of the counter PLSCNT is greater than 50, the maximum value 255 is set in the register SPDATA in step #214. In step #216 the values of the register SPDATA and flag DIR-F are output to the USM controller 58. The motor 15 is switched on in step #218 and the flow returns to the original routine. In this case, the SPDATA has a characteristic linearly varying to the maximum value 255 instead of a characteristic varying in steps as shown in FIG. 15.

According to the second embodiment, as described above, the motor is controlled to rotate at a speed corresponding to the difference between the amount of operation of the operation member 30a and the actual amount of movement of the motor 15 detected, so that the motor can rotate at a high speed when a large amount of movement is involved and at a low speed as the amount of movement decreases. This can ensure smooth lens driving reflecting the photographer's intention while effectively utilizing the good response characteristic of an ultrasonic motor.

According to the second embodiment, the amount-of-operation data is up-counted while the feedback data is down-counted. The former data may be down-counted, and the latter up-counted. In the speed controller 13, the amount-of-operation data pulse and feedback data pulse are counted using the same counter and the driving speed of the motor 15 is set based on the counter value. These pulses may be counted by separate counters, and the same effect can still be obtained. The third embodiment designed to realize the above will now be described referring to FIGS. 17 through 20. As the third embodiment has the same structure as the second one, illustration of its arrangement will be omitted.

Figure 17:
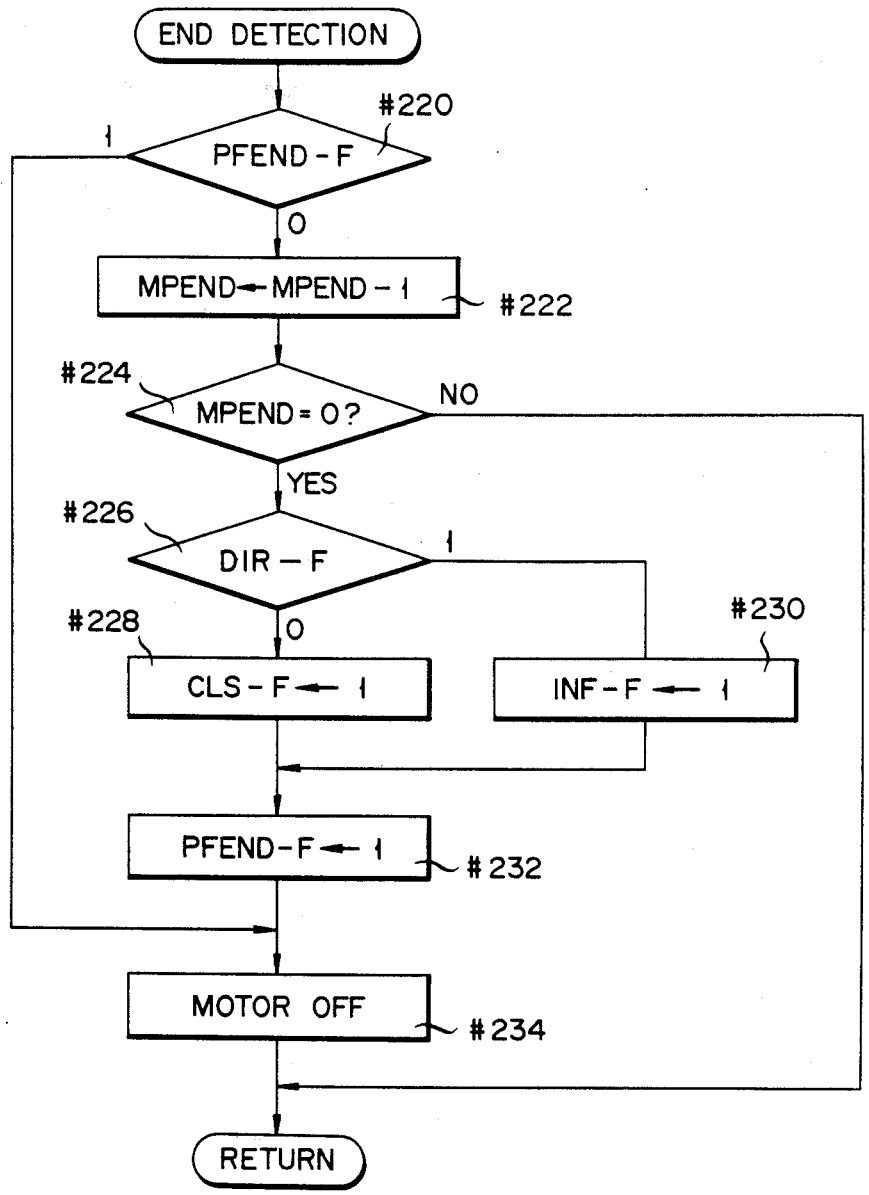
FIG. 17 is a flowchart for a subroutine "End Detection" according to the third embodiment.

FIG. 17 illustrates a flowchart for the subroutine "End Detection" executed every 2 ms. In step #220 the value of a counter PFEND-F indicating the end of driving is checked. When PFEND-F=1, it is considered that the lens has reached the driving end, and the motor 15 is turned off in step #234 before the flow returns to the original routine. When PFEND-F=0, the value of a counter MPEND in which 25 is set every time the "Feedback Interruption" occurs, is decremented by 1. In step #224 it is determined whether or not the lens has reached the driving end by checking if MPEND=0. If MPEND≠0, which indicates the lens having not yet reached the driving end, the flow promptly returns to the original routine. If MPEND=0, the value of a motor direction control flag DIR-F is checked in step #226. If the value of the this flag is 0, 1 is set in a closest end flag CLS-F in step #228. If the value of the flag DIR-F is 1, 1 is set in an infinity end flag INF-F in step #230. Then, 1 is set in the counter PFEND-F in step #232 and the motor 15 is turned off in step #234. The flow then returns to the original routine.

Figure 18:
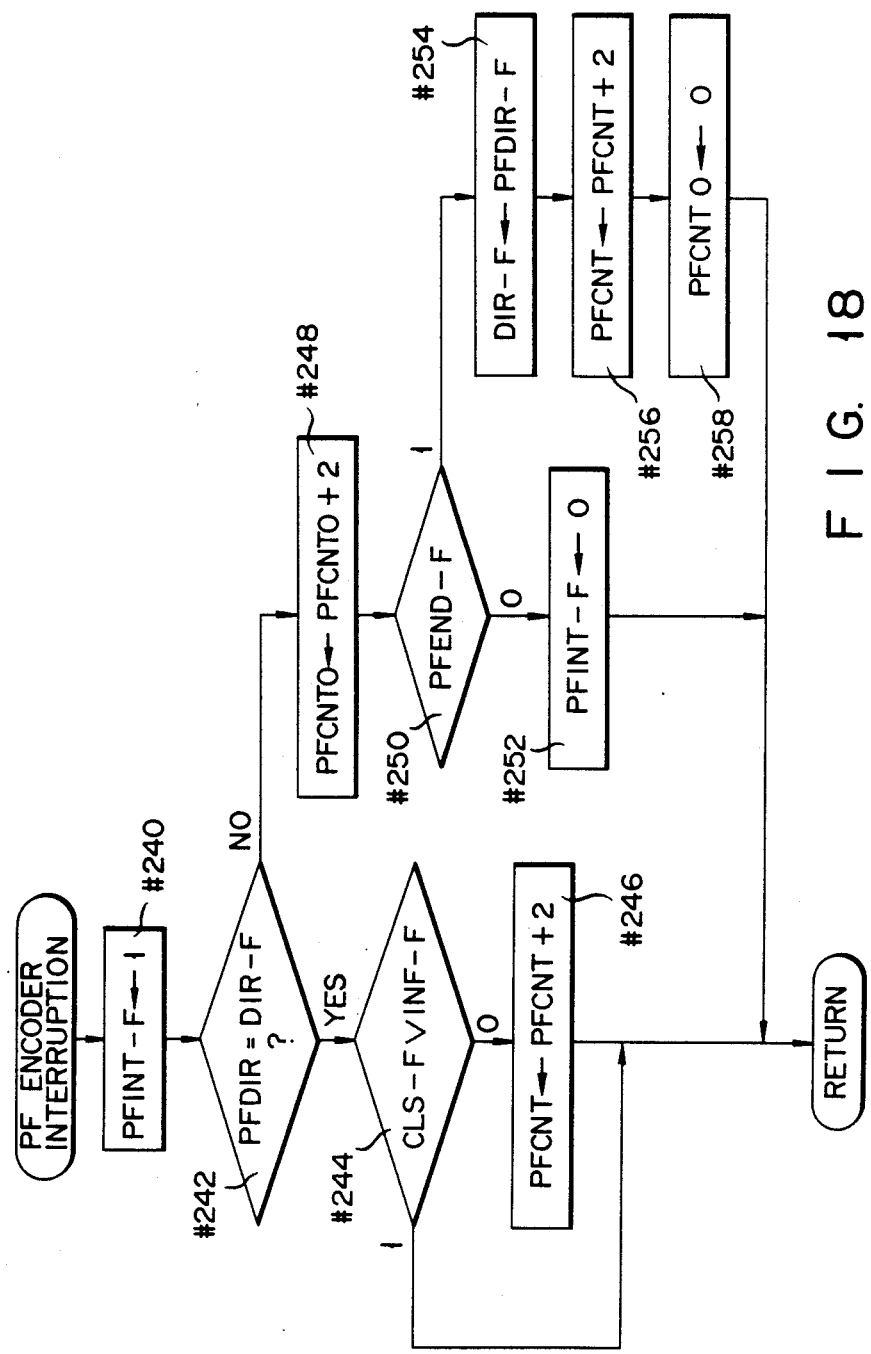
FIG. 18 is a flowchart for a subroutine "PF Encoder Interruption"

FIG. 18 is a flowchart for the subroutine "PF Encoder Interruption". In step #240, 1 is set in the flag PFINT-F indicating the occurrence of the PF encoder interruption. In the subsequent step #242 it is determined whether or not the value of the flag PFDIR-F equals the value of the flag DIR-F. If the values of the flags PFDIR-F and DIR-F equal to each other, the operational direction of the operation member 30a is the same as the rotational direction of the motor 15 and the motor should be further driven in that direction. In step #244, the value of the logical sum of the flags CLS-F and INF-F is checked. If this logical sum is 0, which indicates that the lens has not reached the closest end or the infinity end, the value of the counter PFCENT is incremented by a given number, e.g., 2, in step #246 before returning to the original routine. If the logical sum of the flags CLS-F and INF-F is 1, which indicates that the lens has reached the closest end or the infinity end, the flow promptly returns to the original routine.

If the values of the flags PFDIR-F and DIR-F are not equal to each other in step #242, the value of the counter PFCNTO is incremented by a given number, e.g., 2, in step #248 and the value of the flag PFEND-F is checked in step #250. If PFEND-F=0, which indicates that the lens has not yet been driven to a target position, 0 is set in the flag PFINT-F in step #252 to indicate that the PF encoder interruption has not occurred, then the flow returns to the original routine. If PFEND-F=1, the value of the flag PFDIR-F is set in the flag DIR-F in step #254. The value of the counter PFCNT is incremented by 2 in step #256, and 0 is set in the counter PFCNTO in step #258 before the flow returns to the original routine.

Figure 19:
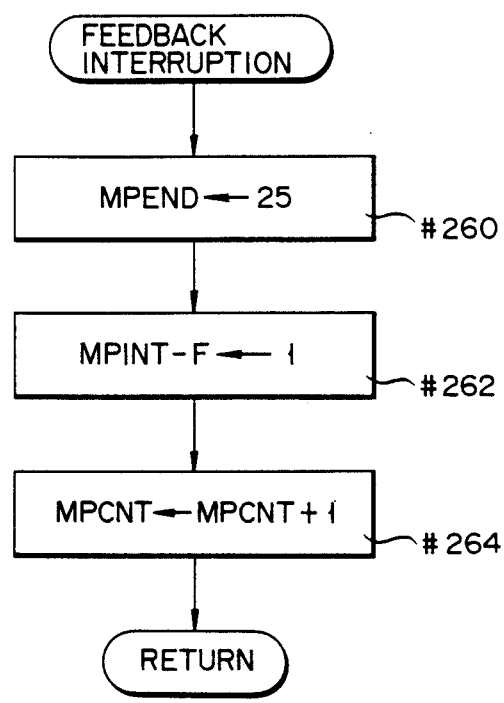
FIG. 19 is a flowchart for a subroutine "Feedback interruption"

FIG. 19 is a flowchart for the subroutine "Feedback Interruption". In step #260, 25 is set in the counter MPEND for detecting the lens reaching the closest end or the infinity end. In step #262, 1 is set in the flag MPINT-F indicating that the feedback interruption has occurred. Then, the value of the counter MPCNT is incremented by 1 in step #264 before the flow returns to the original routine.

Figure 20:
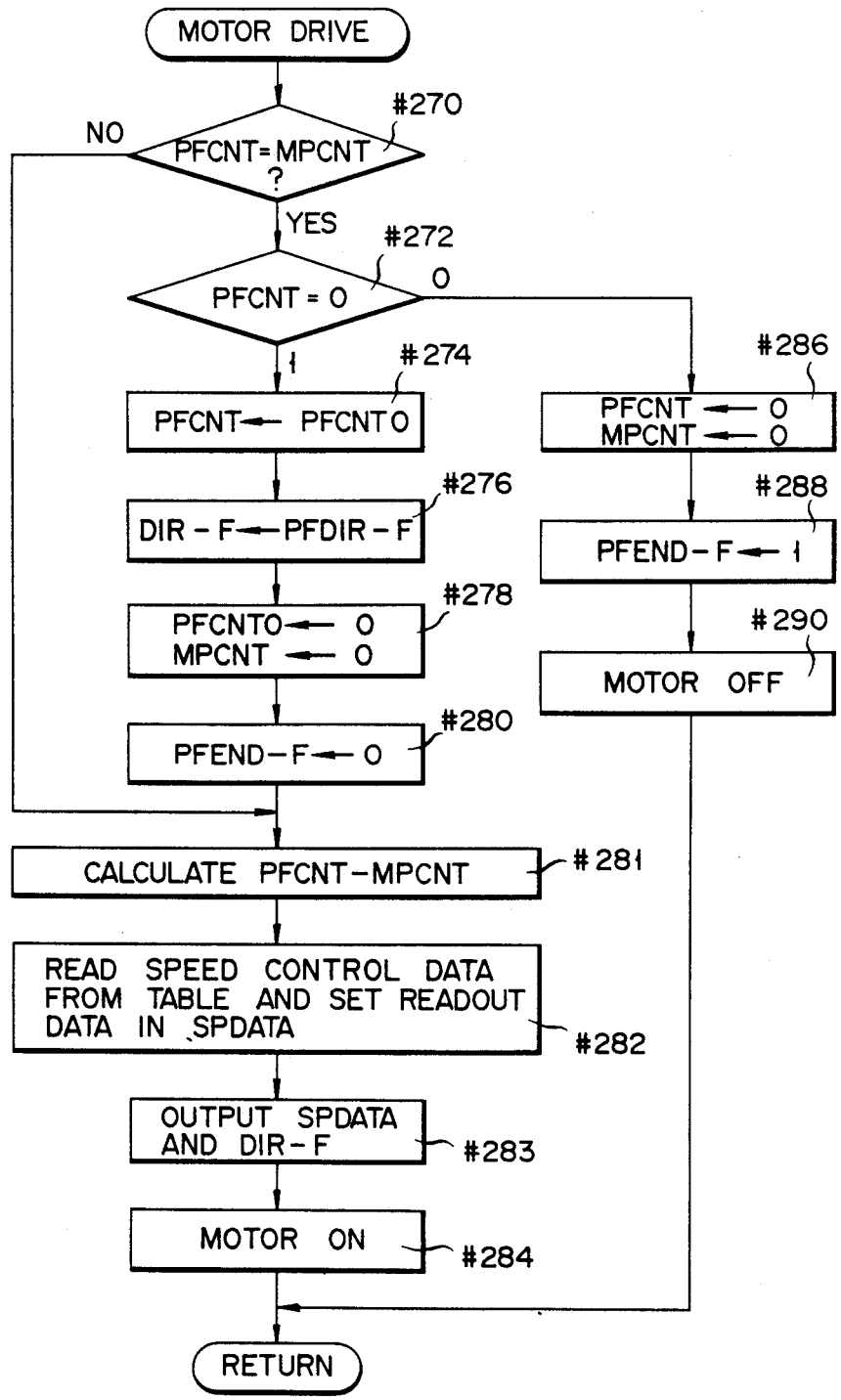
FIG. 20 is a flowchart for a subroutine "Motor Drive".

FIG. 20 is a flowchart for the subroutine "Motor Drive". In step #270 it is determined whether or not the value of the counter PFCNT equals to that of the counter MPCNT. If PFCNT=MPCNT, it is determined whether or not the value of the counter PFCNT is 0 in step #272. If PFCNT≠MPCNT, step #281 is executed.

If PFCNT=1 in step #272, the value of the counter PFCNTO is set in the counter PFCNT in step #274. In step #276 the value of the flag PFDIR-F is set in the flag DIR-F. In the subsequent step #278, 0 is set in the counters PFCNTO and MPCNT. 0 is set in the flag PFEND-F in step #280. The difference between the values of the counters PFCNT and MPCNT is computed in step #281, and data read out from the speed control data table (Table 1) based on the computed difference is set in the register SPDATA in step #282. The value of the register SPDATA and the value of the flag DIR-F are output to the USM controller 58 in step #283, and the motor 15 is turned on in step #284. Then, the flow returns to the original routine.

If PFCNT=0 in step #272, 0 is set in the counters PFCNT and MPCNT in step #286, then 1 is set in the flag PFEND-F in step #288. The flow returns to the original routine after the motor is turned off in step #290.

According to the third embodiment, as should be understood from the foregoing description, the feedback pulse is counted by the counter MPCNT and the amount-of-operation pulse by the counters PFCNT and PFCNTO. The motor driving speed is obtained from the difference between the values of the counters PFCNT and MPCNT in the "Motor Drive" routine (FIG. 20), referring to the speed control data table. When the value of the counter PFCNT coincides with the value of the counter MPCNT, it is considered that the driving of the lens is completed and 1 is set in the flag PFEND-F. The speed control data table is the same except that one of its items, PLSCNT, is simply changed to (PFCNT-MPCNT).

Although the foregoing description has been given with reference to a lens driving apparatus as applied to a power focusing apparatus, the present lens driving apparatus can also be applied to a power zooming apparatus. In this case, the closest end and infinity end in the above-described embodiments need to be simply replaced by the shortest focal length end and the longest focal length end. Alternately, the present lens driving apparatus may naturally be applied to a camera equipped with both the power focusing and power zooming apparatuses.

As described above, according to the lens driving apparatus of the present invention, the amount of operation and the operational direction are detected from operation of the rotational operation member and the amount of driving, driving speed and driving direction of the motor are determined on the basis of the detected information. Accordingly, the amount of operation of the operation member corresponds one-to-one to the driving amount of the motor or the amount of movement of the camera lens. Further, by determining the driving speed proportional to the necessary amount of driving, if the movement of the operation member quickly or abruptly changes to cause an abrupt change in the operating speed, the motor smoothly follows up the change to prevent the otherwise awkward movement of the lens, thus ensuring natural and smooth lens driving as intended by a photographer.

What is claimed is:

1. A lens driving apparatus comprising:
   a manually operable operation member for indicating driving of a lens;
   first detecting means for detecting an amount of operation and an operational direction of said operation member and generating a first pulse signal according to the amount of operation and an operational direction signal according to the operational direction;
   means for driving the lens;
   second detecting means for detecting driving of the lens and generating a second pulse signal according to an amount of driving;
   speed setting means for sequentially setting a driving speed of said driving means in accordance with a difference between an amount of operation indicated by said first pulse signal and an amount of driving indicated by said second pulse signal; and
   means for controlling said driving means in accordance with the operational direction signal and an output of said speed setting means.

2. The apparatus according to claim 1, in which said speed setting means comprises:
   first counter mean for counting the first pulse signal in incrementing manner and counting the second pulse signal in decrementing manner and
   means for determining the driving speed based on a count value of said first counter means.

3. The apparatus according to claim 2, further comprising:
   means for detecting a driving direction of the lens;
   second counter means for counting the first pulse signal until said count value of said first counter means becomes 0 when a driving direction of the lens does not coincide with the operational direction of said operation member; and
   means for transferring a count value of said second counter means into said first counter means after the count value of said first counter means becomes 0.

4. The apparatus according to claim 1, in which said speed setting means comprises:
   first counter means for counting the first pulse signal;
   second counter means for counting the second pulse signal; and
   means for determining a driving speed based on a difference between count values of said first and second counter means.

5. The apparatus according to claim 1, in which said speed setting means comprises:
   means for storing a table for a driving speed data corresponding to a difference between the amount of operation and the amount of driving; and
   means for determining the driving speed based on the driving speed data read out from said table in accordance with the difference between the amount of operation and the amount of driving.

6. The apparatus according to claim 1, in which said speed setting means comprises:
   means for performing a predetermined arithmetic operation on a difference between the amount of operation and the amount of driving; and
   means for determining the driving speed based on a result of said arithmetic operation.

7. The apparatus according to claim 1, in which said first detecting means comprises:
   means for generating two pulse signals having different phases according to an operation of said operation member; and
   means for generating the first pulse signal and the operational direction signal from said two pulse signals.

8. The apparatus according to claim 1, in which said speed setting means comprises means for determining a driving speed proportional to a difference between the amount of operation and the amount of driving.

9. The apparatus according to claim 1, in which said speed setting means comprises means for sequentially determining the driving speed until a difference between the amount of operation and the amount of driving becomes 0.

10. A lens driving apparatus comprising:
    means for generating two encoder pulse signals having mutually different phases in accordance with an operation of a manual operation member;
    first detecting means for detecting an amount of operation and an operational direction of the manual operation member based on said two encoder pulse signals;
    means for driving a lens;
    second detecting means for detecting an amount of driving of the lens based on a feedback pulse signal generated in accordance with movement of the lens caused by said driving means; and
    central processing unit means for generating a driving direction signal representing a driving direction of the drive means based on the operational direction detected by said first detecting means and generating a driving speed signal representing a driving speed of said drive means based on a difference between the amount of operation detected by said first detecting means and the amount of driving detected by said second detecting means, and repeating generation of the driving direction signal and the driving speed signal until said difference becomes 0.

11. The apparatus according to claim 10, in which said central processing unit means includes:
    first counter means for counting the amount of operation detected by said first detecting means, in incrementing manner, and counting the amount of driving detected by said second detecting means, in decrementing manner; and
    means for generating the driving speed signal based on a count value of said first counter.

12. The apparatus according to claim 11, in which said central processing unit means includes:
  second counter means for counting the amount of operation detected by said first detecting means, in incrementing manner, until said count value of said first counter means becomes 0 when a driving direction of the lens does not coincide with the operational direction of the operation member detected by said first detecting means; and
  means for transferring a count value of said second counter means into said first counter means after said count value of said first counter means becomes 0.

13. The apparatus according to claim 10, in which said central processing unit means comprises:
  first counter means for counting the amount of operation detected by said first detecting means;
  second counter means for counting the amount of driving detected by said second detecting means; and
  means for generating the driving speed signal based on a difference between count values of said first and second counter means.

14. The apparatus according to claim 10, in which said central processing unit means comprises:
  means for storing a table for a driving speed data corresponding to a difference between the amount of operation detected by said first detecting means and the amount of driving detected by said second detecting means; and
  means for generating the driving speed signal based o the driving speed data read out from said table in accordance with a difference between the amount of operation and the amount of driving.

15. The apparatus according to claim 10, in which said central processing unit means comprises:
  means for performing a predetermined arithmetic operation on a difference between the amount of operation detected by said first detecting means and the amount of driving detected by said second detecting means; and
  means for determining the driving speed based on a result of said arithmetic operation.

16. The apparatus according to claim 10, in which said central processing unit means comprises means for determining the driving speed proportional to a difference between the amount of operation and the amount o driving.

17. A lens driving apparatus comprising:
  a manually operable operation member for indicating an amount of driving of a lens;
  means for driving the lens;
  detecting means for detecting an amount of driving of the lens driven by said driving means; and
  means for controlling a driving speed of said driving means in accordance with a difference between the amount of driving indicated by said operation member and the amount of driving detected by said detecting means.

18. The apparatus according to claim 17, in which said speed controlling means comprises:
  counter means for counting the amount of driving indicated by said operation member in incrementing manner and counting the amount of driving detected by said detecting means in decrementing manner; and
  means for controlling the driving speed based on a count value of said counter means.

19. The apparatus according to claim 17, in which said speed controlling means comprises:
  first counter means for counting the amount of driving indicated by said operation member;
  second counter means for counting the amount of driving detected by said detecting means; and
  means for comparing outputs of said first and second counter means with each other and controlling the driving speed in accordance with a comparison result.

20. The apparatus according to claim 17, in which said speed controlling means comprises means for determining a driving speed proportional to a difference between the amount of driving indicated by said operation member and the amount of driving detected by said detecting means.

21. A lens driving method in a lens apparatus comprising means for generating an operational direction signal according to an operational direction of a manual operation member, means for driving a lens and means for detecting an amount of driving of the lens, said method comprising the steps of:
  detecting the amount of operation of the manual operation member;
  detecting the amount of driving of the lens;
  obtaining a difference between the amount of operation and the amount of driving.,
  permitting said drive means to function at a driving speed corresponding to the difference; and
  repeating the above four steps until the difference becomes 0.

22. A lens driving apparatus for use in a camera, comprising:
  means for driving a lens system for adjusting a focus or an angle of view of a camera lens by means of a motor;
  a manually operatable rotational operation member;
  means for generating two pulse signals having different phases in accordance with an operation of said rotational operation member;
  means for generating an operational direction signal representing a direction of rotational operation of said rotational operation member based on the two pulse signals;
  means for generating an amount-of-operation pulse signal representing an amount of rotational operation of said rotational operation member based on the two pulse signals;
  means for generating an amount-of-driving pulse signal representing an amount of driving in accordance with driving of the lens system;
  means for counting the amount-of-operation pulse signal in incrementing manner and counting the amount-of-driving pulse in decrementing manner;
  means for determining a driving speed of the motor in accordance with a count value of said counting means; and
  means for controlling said driving means in accordance with the driving speed determined by said deter mining means and the operational direction signal.

23. A lens driving apparatus for use in a camera, comprising:
  means for driving a lens system for adjusting a focus or an angle of view of a camera lens by means of a motor;
  a manually operatable rotational operation member;

means for generating an operational direction signal indicating a direction of rotational operation of said rotational operation member;

means for generating an amount-of-operation pulse signal indicating an amount of rotational operation of said rotational operation member;

means for generating an amount-of-driving pulse signal indicating an amount of driving in accordance with driving of the lens system;

speed determining means for calculating a difference between the amount of operation indicated by the amount-of-operation signal and the amount of driving indicated by the amount-of-driving signal and determining a driving speed of the motor in accordance with the difference; and means for controlling said driving means in accordance with the driving speed determined by said speed determining means and the operational direction signal.

24. The apparatus according to claim 23, in which said speed determining means comprises means for storing a table for a driving speed data corresponding to the difference.

* * * * *